United States Patent [19]

Fouss et al.

[11] 4,360,042
[45] * Nov. 23, 1982

[54] ARCHED CONDUIT WITH IMPROVED CORRUGATIONS

[75] Inventors: James L. Fouss; John J. Parker; James L. Child, Jr., all of Findlay, Ohio; Donald W. Sting, New Canaan, Conn.

[73] Assignee: Hancor, Inc., Findlay, Ohio

[*] Notice: The portion of the term of this patent subsequent to Jan. 20, 1998, has been disclaimed.

[21] Appl. No.: 164,969

[22] Filed: Jul. 1, 1980

Related U.S. Application Data

[63] Continuation-in-part of Ser. No. 967,514, Dec. 7, 1978, Pat. No. 4,245,924.

[51] Int. Cl.³ .................. F16L 11/11; E02B 11/00
[52] U.S. Cl. .................. 138/119; 138/105; 138/122; 138/173; 405/45; 405/49
[58] Field of Search .............. 138/118, 121, 122, 119, 138/105, 173; 405/43, 45, 49

[56] References Cited

U.S. PATENT DOCUMENTS

| 770,236 | 9/1904 | Lauridtzen . |
| 2,876,801 | 3/1959 | November ............ 138/121 |
| 3,369,367 | 2/1968 | Saad et al. . |
| 3,440,823 | 4/1969 | Olsen . |
| 4,079,757 | 3/1978 | Fischer et al. ............ 138/121 |
| 4,245,924 | 1/1981 | Fouss et al. ............ 138/119 X |

FOREIGN PATENT DOCUMENTS 69088 11/1969 German Democratic Rep. .
6401043 8/1964 Netherlands .

OTHER PUBLICATIONS

Drainage Contract, vol. 6, No. 1, p. 54, (1980 Winter Edition).

Primary Examiner—James E. Bryant, III
Attorney, Agent, or Firm—Fay & Sharpe

[57] ABSTRACT

A foldable conduit has a generally parabolic arched portion and a flat base. The arched portion comprises a pair of corrugated side walls which are connected with a hinge. The corrugations comprise alternating peak portions and valley portions. Each peak portion comprises a pair of generally vertical corrugation walls and a top wall connected with the corrugation walls. The top wall has a pair of ribs, each adjacent one of the pair of corrugation walls. Between the ribs is a recessed area. The ribs and recessed area are arcuate and generally undulating in cross section. The valley portion comprises an arcuate valley wall connected with the corrugation walls of adjacent peak portions. The flat base is a flexible sheet which may be perforated to permit fluid ingress and egress. The hinge and flexible base allow the side walls to be folded together with the base folded in between for more compact shipment.

24 Claims, 17 Drawing Figures

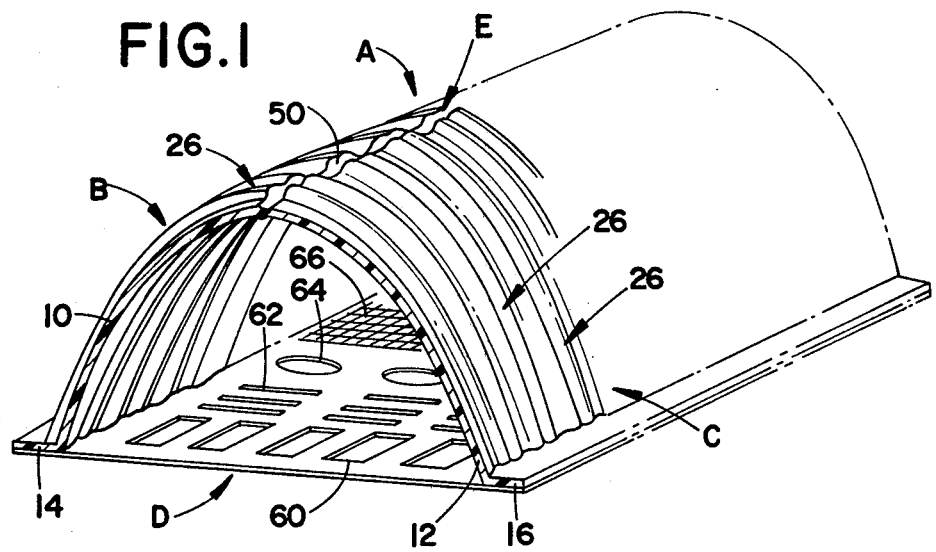
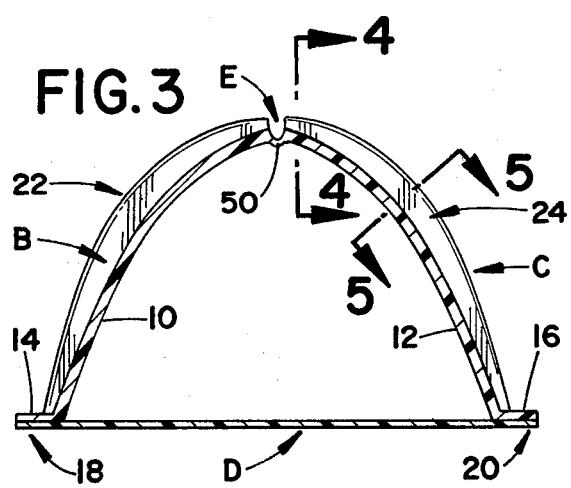
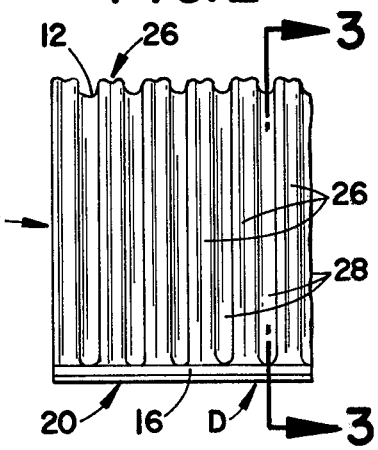
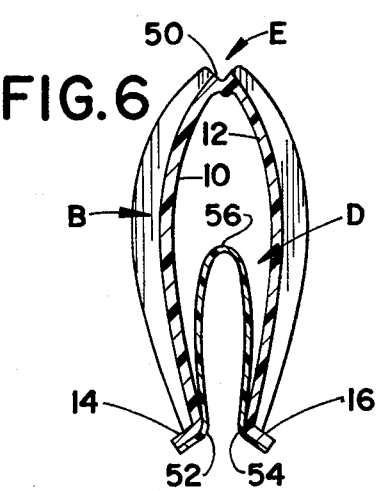
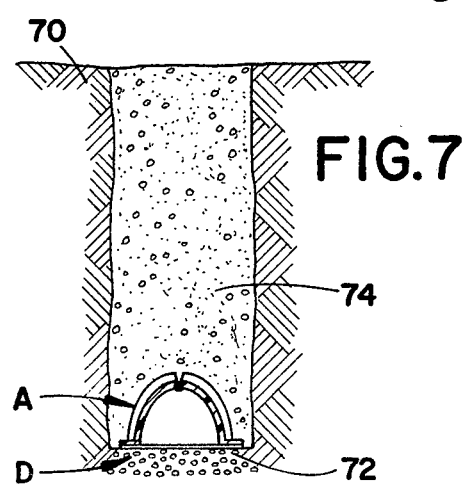

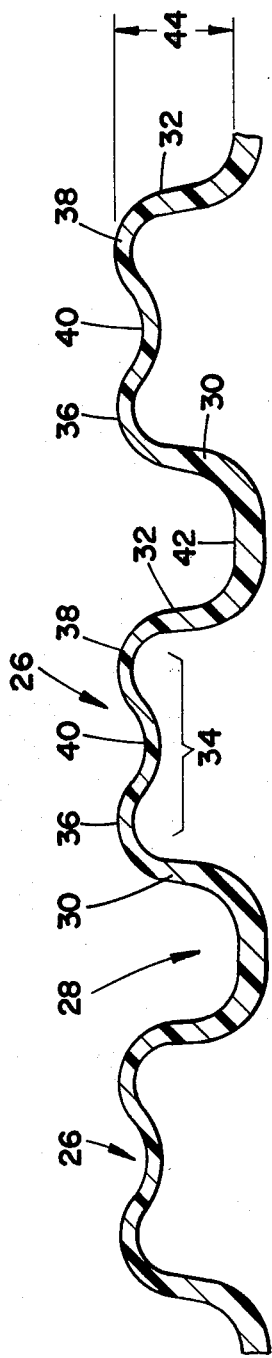
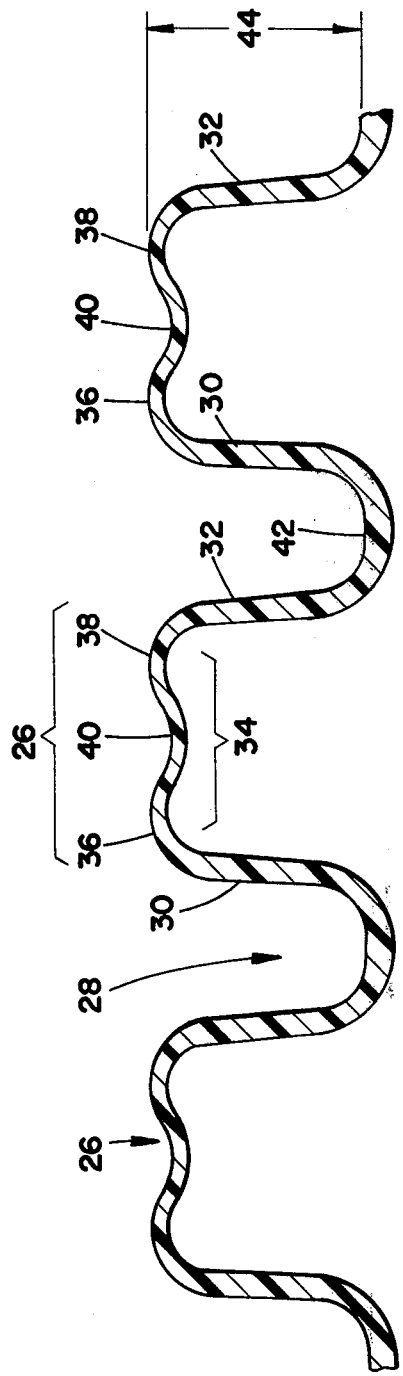
FIG. 4
FIG. 5

ARCHED CONDUIT WITH IMPROVED CORRUGATIONS

BACKGROUND OF THE INVENTION

This application is a continuation in part of U.S. patent application Ser. No. 967,514, filed Dec. 7, 1978, now U.S. Pat. No. 4,245,924.

This invention pertains to the art of pipe, tubing and conduits. More particularly, it pertains to conduits having a high strength to weight ratio such as corrugated plastic tubing.

The invention is particularly applicable to corrugated plastic drain tubing and will be described with particular reference thereto although it will be appreciated that the invention has much broader applications. For example, the inventive concepts are also deemed applicable to culverts, tunnels, subterranean conduits and the like.

Drainage tubing is conventionally used to remove excess surface and subsurface water from agricultural fields as well as from commercial and residential establishments. Generally, a trench is dug in the soil by a trench digging machine. The drainage tubing is positioned along the base of the trench and the trench is backfilled. Water entering the tubing at one end and/or over the length thereof is carried to the other end for disposal.

Until recently, drainage tubing primarily comprised short lengths of cylindrical concrete or ceramic tiles. In laying these tiles along the base of the trench, they were typically spaced a small distance apart to provide a small gap for allowing water to enter into the tiles. This spacing was generally in the range of 1/16" or so. Shifting of the soil, however, often caused the tiles to become misaligned which diminished their effectiveness. Further, such tile is heavy and cumbersome to handle and install. If heavy loads are applied, or if they are not bedded properly, individual ones of the tiles can break or shift and interrupt the water flow path.

In recent years, use of the individual concrete or ceramic tiles has been replaced by round or cylindrical corrugated plastic drainage tubing for many applications. Lengths of corrugated plastic tubing are fastened together at their ends to alleviate the aforementioned misalignment problems. The corrugated configuration generally consists of alternating outward projecting peaks and inward projecting valleys which increase the strength and rigidity of the tubing. Frequently the peaks are corrugated with a pair of small annular peaks or ribs which are separated by a shallow annular valley or recess area. These small corrugations or ribs on the peaks further increase the strength of the tubing. Such tubing is usually perforated in the valleys at spaced intervals to allow water ingress and egress. The interior of the peaks are hollow and form troughs which collect sediment at the bottom or lower most areas of the tubing. Moreover, the round tubing shape defines a relatively large interior volume. In shipping, this is undesirable because the tubing tends to cause the tubing to fill the volume capacity of transporting vehicles without also filling their weight capacity. While corrugated plastic tubing constructions do not have the breakage problem associated with concrete or clay tile and have largely replaced such tile in many common applications, improper bedding of plastic tubing can result in excessive tubing deflection.

To reduce bulk for shipping, others have produced seamed tubing which is shipped flattened and assembled into its round or other shape just prior to installation. Such an arrangement is shown in, for example, U.S. Pat. No. 3,583,424. Others have attempted to develop collapsible tubing which is folded flat for storage and shipping purposes and then unfolded or opened for installation. Examples of such prior arrangement are shown in U.S. Pat. Nos. 3,343,567 and 3,508,587, East German Pat. No. 69,088, and Netherlands Pat. No. 6,401,043. However, both the seamed and collapsible tubing constructions have failed to meet with public acceptance for various reasons. Included among these reasons ae their high cost of manufacture, difficulty in assembling and handling, and a lack of structural strength particularly at the seams, hinges, and side walls.

The present invention contemplates a structure or article which overcomes all of the above problems and others, and provides a new and improved arched conduit which is economical to manufacture, easy to ship, easy to handle, high in strength and which is readily adapted to use in a broad range of practical applications. The present invention has an improved, high strength to amount of material ratio.

SUMMARY OF THE INVENTION

In accordance with the present invention, there is provided a conduit which comprises an elongated element that has an arched or semiround transverse cross section and a base. The elongated element has transverse corrugations comprising alternating peak portions and valley portions. The peak portions include pairs of corrugation walls which are connected with a top wall that has an undulating cross section.

In accordance with a more limited aspect of the invention, the elongated element comprises a pair of side walls which are hingedly connected at an apex area and the base is foldable. This allows the conduit to be folded.

In accordance with a yet more limited aspect of the invention, the top wall of the peak portions comprises first and second outward extending rounded ribs and an inward extending rounded recess between the ribs.

One advantage of the present invention is that the new and improved conduit construction is stronger, yet requires less material to manufacture than prior cylindrical plastic tubing of a similar capacity. The conduit is stronger than other semiround conduits.

Another advantage of the present invention resides in the capabilities of the conduit to be folded so as to reduce its bulk for storage and shipping and in the method of handling same.

Yet another advantage of the present invention is that the conduit base is wide and generally smooth for reducing the amount of sediment collection and, if perforated, the hydraulic gradient of in-flowing liquid.

Still other advantages and benefits for the subject arched conduit construction will become apparent to those skilled in the art upon a reading and understanding of the following specification and accompanying drawings.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof.

FIG. 1 is a perspective view of a conduit formed in accordance with the concepts of the present invention disposed in its opened configuration;

FIG. 2 is a side view of a portion of the conduit shown in FIG. 1;

FIG. 3 is a cross sectional view taken along section line 3—3 of FIG. 2;

FIG. 4 is a cross sectional view taken along section line 4—4 of FIG. 3;

FIG. 5 is a cross sectional view taken along section line 5—5 of FIG. 3;

FIG. 6 is a cross sectional view of the conduit disposed in its folded configuration;

FIG. 7 is a cross sectional view of the conduit shown in FIG. 1 installed in a subterranean environment.

DESCRIPTION OF THE PREFERRED EMBODIMENT

Figure 8:
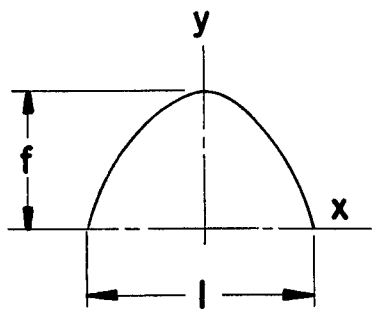
FIG. 8 illustrates a parabola.

Reference is made to the drawings for purposes of illustrating the preferred embodiment of the invention only and not for purposes of limiting the same. The FIG. 1 shows an elongated conduit A comprised of a pair of cooperating spaced apart side walls B, C which form an elongated element, and a base D. Walls B and C are pivotally connected to each other at their apex side edge areas by a connecting means or hinge E. The opposite side edges of base D are affixed to the side walls B and C adjacent their terminal side edge areas.

In the preferred embodiment note FIGS. 1–3, conduit A is generally semiround or arched in cross section. Semiround connotes a structure with a open rounded portion that can be closed with a generally flat portion, such as a semicircle, semiellipse, parabola or the like. The rounded portion can also be composed of a plurality of arc or linear segments which, taken as a whole, form a generally rounded portion. In particular, it has been determined that a parabolic inside cross section with a height to width ratio of approximately 0.65 provides a desirable balance between compressive strength and flat folding characteristics. Additional advantages for this configuration will become more readily apparent hereinafter.

Alternately, however, the arched cross section of the conduit could have a generally triangular shape with first and second walls B, C being generally linear. This shape enables the conduit to be folded to a very flat condition, but is lacking in compressive strength. Moreover, first and second walls B, C may be more rounded for increasing compressive strength. These walls may define semicircular, semielliptic, multiradii, linearly and/or arcuately segmented, or other generally semiround or arched cross sections. The advantages and suggested uses of these alternate embodiments are set forth below.

In the preferred embodiment, side wall B is comprised of a first wall 10 and side wall C is comprised of a second wall 12 which are shaped in a manner such that in the unfolded position, illustrated in FIGS. 1 and 3, they form a generally parabolic arch. Wall 10 includes an outward extending foot or flange 14 adjacent the terminal side edge thereof and wall 12 includes an outward extending foot or flange 16 which is located adjacent its terminal side edge. These flanges provide bearing surfaces 18 and 20 on which the conduit may rest upon installation and also provide convenient areas or surfaces for attaching the opposite side edges of the base D.

The first and second walls 10 and 12 include corrugations disposed transversely and extending along the lengths. These corrugations are defined by a plurality of alternating, interconnected outward extending peak portions 26 and inward extending valley portions 28, note FIGS. 2, 4, and 5. The peak portions provide superior resistance to compressive forces or loading. Although the peaks may be of constant height as is conventional in prior round corrugated tubing constructions, the outer surface or top walls of the peaks 26 are more round in transverse cross section than are valleys 28, note FIG. 3. In particular, the peaks 26 are contoured to have a corrugation height relative to their adjacent valleys at each point along the side walls which corresponds to the side walls tendency to deflect.

In a subterranean installation, the conduit is subjected to loading and compressive forces from the soil and subsurface water. The compressive forces from the soil primarily arise from the backfill in the trench. This produces a generally parallel plate-type of loading (note FIG. 13). Subsurface water produces generally hydrostatic loading (note FIG. 15). A parabolic cross section is relatively strong in supporting parallel plate loading, but relatively weak with regard to hydrostatic loading. Under the parallel plate loading of a normal installation there is a tendency for the parabolic arch to be deformed slightly into a more rounded cross section. This rounding increases the conduit's strength under hydrostatic loading. Further, the outer surface or top walls of corrugation peaks define a more rounded, generally semielliptic or semicircular contour. This corrugation contour has a cross section which is relatively strong under hydrostatic loading. As discussed below, other semiround cross sections are advantageous under certain loading conditions.

The parallel plate and hydrostatic loading tend to deflect the conduit. For a semiround or arched structure, the amount of deflection is not constant at all points. For example, at the base, the deflection is generally zero. Indicators of the amount of deflection include the bending moment and moment of inertia. These are also indicators of the necessary or desired corrugation height at each point along the arch. By analyzing the structure mathematically or by using force diagrams, the bending moment at points along the arch under expected loading conditions is readily determinable. The moment of inertia at each point along the arch is a function of several factors, including corrugation height, material thickness and the like. The corrugation height is selected such that the moment of inertia at each point along the arch conforms to a predetermined function of the bending moment at the same point. In the preferred embodiment, the corrugation height is selected such that the moment of inertia is directly proportional to the bending moment at each point. Alternately, the moment of inertia may be proportional to the bending moment squared or proportional to the sum of the bending moment and the secant of the angle of the tangent at each point. One method of determining the corrugation height corresponding to the selected functional relationship between the moment of inertia and bending moment is by successive approximations. Because the bending moment and moment of inertia are essentially zero at the apex and base edges of a parabolic arch, the corrugation height is lower adjacent their apex and terminal side edge ends. This reduced height is shown in FIG. 3 adjacent flanges 14, 16 and adjacent hinge E.

With particular reference to FIGS. 4 and 5, the peak portions 26 each comprise a pair of generally vertical corrugation walls 30 and 32. The corrugation walls 30 and 32 connect adjacent peak and valley portions. The corrugation walls converge symmetrically from the valley to the peak portions at about 3 degrees. Each peak portion has a top wall 34 which has a generally undulating cross section between adjacent valley portions i.e., transverse to the longitudinal extension of the peak portion. The top wall 34 comprises a first generally rounded outward extending rib 36 adjacent the first corrugation wall 30 and a second outward extending rib 38 adjacent the second corrugation wall 32. Between the first rib 36 and the second rib 38 is an inward extending generally rounded recess 40. The depth of the recess 40 relative to ribs 36 and 38 is about twice the thickness of the material in the ribs and the recess. A depth of 0.040 inches is preferred for 4" equivalent pipe. The ribs and recess area effectively provide corrugations on the peak portions which increases the strength of the peak portions, the corrugations, the side walls, and the conduit.

The valley portions 28 have a valley wall 42 extending between the corrugation walls 30 and 32 of adjacent peaks which is generally rounded in cross section. The corrugations have a corrugation height 44 which is the distance between the outer surfaces of the top wall 34 and the valley wall 42. The corrugation height at section 5—5 is about twice the corrugation height at section 4—4. Alternately, the top wall 34 may be reinforced with one rib, more than two ribs, solid ribs, ribs with square, triangular, or other cross sections, two or more recesses or the like. Similarly, valley wall 42 may be corrugated with one or more ribs. Further the top wall and valley wall of every peak and valley portions need not be the same. For example, alternate top walls may be substantially flat. Further corrugation walls 30 and 32 can be strengthened with radial thickened columns.

The side walls 10, 12 of the preferred embodiment are manufactured from a thermoplastic material such as ABS or other styrene polymers, polyethylene, or the like. However, other types of plastics and materials could be advantageously employed without departing from the overall intent or scope of the invention.

As shown in the FIGURES, connecting means or hinge E is preferably located along the apex of the semiround or arched cross section at the area where the side walls 10, 12 are connected. The apex location is preferred but other locations might be employed. This geometrical configuration facilitates fairly compact folding. Although seams, welds and many other types of multi-element connecting means or constructions may be advantageously employed, it is preferred that this connecting means be formed integral with the side walls 10, 12 in the general nature of a hinge.

Hinge E includes a small trough 50 cut or molded into the inner or outer surfaces of the arch in order that the apex will be somewhat thinner than the side walls 10, 12. This increases the flexibility of the conduit at the hinge area for accommodating folding and bending. The depth of trough 50 compared with the thickness of the side walls 10, 12 to either side varies with the material chosen. Generally, this is based on such factors as material strength and flexibility compared against fatigue resistance. With some materials, a simple lack of corrugations at the apex is sufficient to form the hinge. The peak portions 26 are spaced a small distance apart at the apex area and may include shoulders which abut each other to inhibit the conduit from unfolding beyond the desired parabolic cross section.

The first and second walls 10, 12 are designed to have high bending strength, whereas base D is designed to have high tensile strength. In the preferred arrangement, base D rests directly on the bottom of a trench from which it receives support for the weight of the liquids conveyed. In addition to the forces from the weight of the conveyed liquids the base is subject to forces tending to cause walls 10, 12 to spread apart from each other. For example, top loading forces on the semiround or arched construction such as are encountered from backfilling tend to force flanges 14, 16 outward along the bottom of the trench. This tends to flatten the arch. The base is designed with sufficient tensile strength to prevent the terminal side edges of the first and second side walls from spreading beyond the desired shape.

Another desirable physical characteristic for the base is that it is sufficiently foldable to enable the arch to be folded generally in the manner shown in FIG. 6. In this folded position, flanges 14, 16 are moved toward each other to a generally abutting relationship. To enable the arch to be folded, base D is designed to pivot or fold adjacent to flanges 14, 16 and along at least one generally intermediate area. This result can be accomplished with the use of a generally rigid sheet having three or more hinges, fold lines, or areas or with the use of a flexible sheet-like material. Two of the fold areas 52 and 54 are disposed longitudinally along flanges 14 and 16 and another fold area 56 intermediate the first two such that the flanges can be moved adjacent each other with the base bending. In the preferred arrangement, a thin flexible sheet of plastic material is contemplated, e.g. a 10 mil sheet. Polymeric materials such as polyethylene, MYLAR, metallic foils and the like would be satisfactory. Other, more rigid materials that are hinged, attached only to one side walls, or removable may also be used. When folding is not necessary or particularly advantageous for one reason or another, the base may comprise a permanently attached rigid element or a plurality of spaced elements.

The opposed side edge areas of base D are attached to flanges 14, 16 by convenient means such as sewing, gluing, welding, stapling, heat sealing, frictional engagement or the like. The particular attaching means used is, to some extent, regulated by the materials from which the side walls 10, 12 and base D are manufactured and the particular use contemplated for the conduit.

For transporting fluids, the base may be imperforate and for collecting or dispersing liquids, the base may be perforated. For some uses such as culverts or underpasses, the base may be comprised of periodically spaced elements such as cables or the like. It may even be possible to eliminate the base entirely in some specific applications of the subject inventive concepts.

For collecting or dispersing liquids, apertures may be provided in base D in a variety of manners. For example, as shown in FIG. 1, a series of openings 60 may be cut out of the base, a series of slits 62 may be cut into the base, or a series of flaps 64 may be stamped into the base. In addition, the base may be comprised of a mesh 66 or contain sections of mesh interposed between sections of solid or otherwise apertured film material. More particularly, mesh 66 may comprise nylon net, plastic impregnated fiber screen, polymeric spun bonded filter cloth, and the like. A suitable polymeric spun bonded filter cloth is marketed by E. I. Dupont deNemours & Co., Inc. under the trademark TYPAR.

Numerous other aperture systems may also be used while practicing the overall inventive concepts involved herein. Alternately, apertures may be cut into first and second walls 10, 12, into the valley portions 28, into the corrugation walls 30 and 32, or the like, instead of or in addition to the apertures in base D. It has been found advantageous, however, to place the apertures or openings in the base because of its large surface area. This large surface area enables a relatively large number of apertures to be provided which facilitate greater ingress and/or egress of fluids. For example, if 15 percent to 20 percent of the surface area of base D is perforated, approximately 8 to 12 times as much effective water entry area is provided than is present in conventional cylindrical or round perforated tubing. Further, the hydraulic gradient which is related to the difference between the pressure of fluids within the tubing to the pressure of fluids exterior to the tubing is reduced as the number or size of apertures increase. As the hydraulic gradient is decreased so too is the amount of soil particles which are apt to be broken away by the liquids or water and carried into the tubing.

With regard to the manufacture and use of conduit A, one preferred method of manufacture employs conventional blow molding techniques on a continuous blow molding machine whereby first and second walls 10, 12 and hinge E are integrally molded. Other forms of fabrication such as casting and stamping may, of course, be used. The preferred polymeric film material used for base D is unwound from a reel for continuous bonding at its side edge areas to flanges 14, 16 in conjunction with the continuous blow molding operation. The arch is then folded at hinge E (FIG. 6) with base D folded to the inside of the conduit walls. The folded conduit may then be rolled in much the same manner as a fire hose to form a coil for compact storage and shipment.

At a typical installation site, such as that schematically shown in FIG. 7, a trench is dug in soil 70 with conventional trenching equipment. The conduit is then unrolled onto the generally smooth, flat trench bottom or floor 72 or onto some other base. The conduit is expanded to its arched shape (FIGS. 1 and 3) either by the inherent resiliency of the plastic material or by the application of a vertical pressure near the apex area. Loose soil 74 is then backfilled into the trench. For installations where the conduit is to be utilized to form a culvert, the conduit is positioned over a lower bed or base and earth is graded over it.

Alternate Preferred Embodiments

The side walls B and C draw their strength from the thickness and strength of the plastic material, their transverse cross section, the corrugations, the corrugation height, the top wall ribs, the transverse and longitudinal cross section of the top wall, the transverse and longitudinal cross section of the valley wall, the thickness and height of the corrugation walls, and the like. By understanding the cooperative interaction of these strengthening characteristics, alternate embodiments and variations of the present invention become readily apparent.

The preferred parabolic arch cross section with a height to width ratio of generally 0.65 is a compromise among several factors including strength under parallel plate loading, strength under hydrostatic loading, maximizing the hydraulic capacity, minimizing the amount of material in the arched portion, optimizing flattened folding characteristics, simplifying fabrication, and many others. The selected compromise achieves an excellent all-around versatile conduit. However, there are other general purpose conduit shapes and special purpose conduit shapes which for some purposes are more advantageous than the parabolic conduit of the preferred embodiment.

Generally, a parabolic such as defines the parabolic cross section of the preferred embodiment is defined by the formula $$y = \frac{4fx}{l^2}(l - x) \tag{1}$$

Where f is the height of the parabola and l is the width of the base area. (See FIG. 8)

Figure 9:
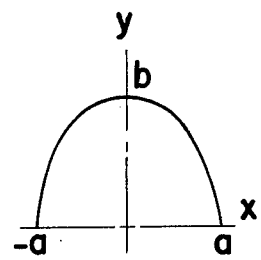
FIG. 9 illustrates a semi-ellipse.

Another preferred cross section is defined by a semi-ellipse, which is illustrated in FIG. 9 and defined generally by the formula $$\frac{x^2}{a^2} + \frac{y^2}{b^2} = 1 \tag{2}$$

where a and b are the major and minor axes, b defining the height and 2a the width of the arch.

Figure 10:
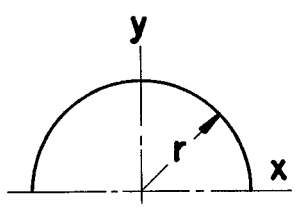
FIG. 10 illustrates a semicircle.

When the major and minor elliptic axes are equal a third preferred cross section, the semicircle is formed. This cross section, illustrated in FIG. 10, is generally defined by the formula $$x^2 + y^2 = r^2 \tag{3}$$

where r is the radius.

Figure 11:
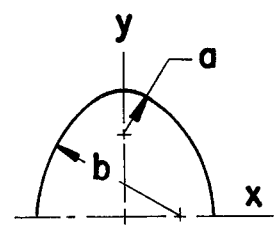
FIG. 11 illustrates a multiradii arch.

The multiradii and linear and/or arcuate segmented cross sections are defined by a multitude of formulae. FIG. 11 is illustrative of an exemplary multiradii cross section with constant radius segments.

Figure 12:
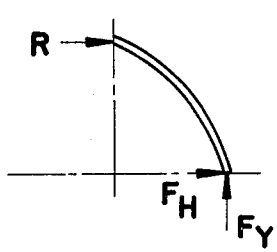
FIG. 12 illustrates forces on an arch.

As stated above, a major design criteria is the maximization of tubing strength, in particular, compressive strength. Under the numerous and various loading conditions which the conduit may be placed, different cross sections provide maximum strength. The force components on an arch under load are describable in terms of the horizontal $F_H$ and vertical $F_V$ components shown in FIG. 12. The cross sectional shape of an arch is defined by the relationship between x and y which describe each point (x,y) on the arch. To determine the strongest cross sectional shape under a specific applied load, the designated load on the arch is maximized for the expected environment and the bending moment is defined as zero. The relationships between all points (x,y) which meet this criteria defines the cross sectional shape which best withstands the selected specific load.

For a hydrostatic load, q, which is applied to an arch, it is known that $$F_V - \frac{ql}{2} = 0 \tag{4}$$

$$R + R_H - qf = 0 \tag{5}$$

where R is the resulting horizontal force at the apex. It is also known that the bending moment, M, at each point (x,y) is $$M = F_V\left(\frac{l}{2} - x\right) + F_H y - \frac{q}{2}\left[\left(\frac{l}{2} - x\right)^2 + y^2\right] \tag{6}$$

Assuming deflection occurs only from bending, then $$\frac{M}{EI} = \left(\frac{1}{R_o} - \frac{1}{R}\right) \tag{7}$$

where E is the modulus of elasticity, I is the moment of inertia and $R_o$ is the original radius of curvature.

Figure 13:
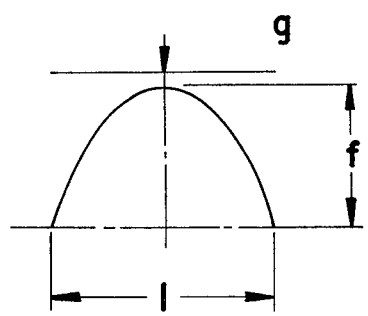
FIG. 13 illustrates forces on an arch under parallel plate loading.

If the load, q, is uniform vertical loading, i.e. applied only vertically as shown in FIG. 13, then equations corresponding to (4)–(7) reduce to the following relationships between x and y:

$$x^2 - \frac{l^2}{4} + \frac{yl^2}{4f} = 0 \tag{8}$$

which equation when translated 1/2 units in the positive direction becomes $$y = \frac{4fx}{l^2}(l - x) \tag{9}$$

which is easily recognized as a parabola.

Figure 14:
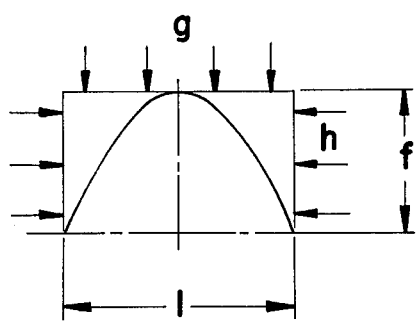
FIG. 14 illustrates forces on an arch.

If the load, q, is a uniform vertical and horizontal load as illustrated in FIG. 14, defined by a vertical component $q_V$ and horizontal component $q_H$, then equations corresponding to (4)–(7) reduce to the following relationships between x and y, $$\frac{x^2}{2} + \frac{q_H y^2}{2q_V} + y\left(\frac{l^2}{8f} - \frac{q_H f}{2q_V}\right) - \frac{l^2}{8} = 0 \tag{10}$$

which equation, when the substitution $$k = \frac{q_H}{q_V} = \frac{l^2}{4f^2} \tag{11}$$

is made, reduces to $$\frac{x^2}{l^2/4} + \frac{y^2}{f^2} = 1 \tag{12}$$

which is readily recognized as an ellipse.

Figure 15:
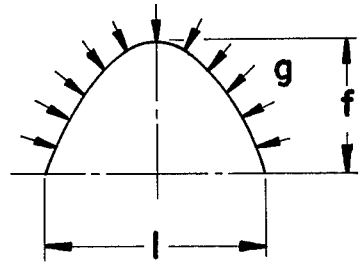
FIG. 15 illustrates forces on an arch under hydrostatic loading.

If the load, q, is hydrostatic loading, i.e. uniformly applied perpendicular to each point (x,y) on the arch as illustrated in FIG. 15 then equations (4)–(7) reduce to the following relationships between x and y, $$x^2 + y^2 + y\left(\frac{l^2}{4f} - f\right) - \frac{l^2}{4} = 0 \tag{13}$$

which equation, when the substitution $$r = f = l/2 \tag{14}$$

is made, reduces to $$x^2 + y^2 = r^2 \tag{15}$$

which is, of course, a semicircle.

Similarly, for other loading conditions, various other cross sectional shapes of the arch are preferred.

The round corrugated tubing industry has developed standard sizes of tubing, such as 4 inch diameter, 6 inch diameter, etc. For customer and governmental acceptance, it is advantageous to match the fluid carrying capacity, also known as the hydraulic capacity, of arched tubing to standard round tubing sizes.

The hydraulic capacity, Q, of a conduit is the product of its cross sectional area for flow, A, and the flow velocity of the fluids therein, V, i.e.

$$Q = AV \tag{16}$$

The flow velocity, however, is determined by several factors such as the roughness of the surface of the conduit, expressable as the roughness coefficient, n; the hydraulic radius, $H_R$, which is defined as the ratio of the cross sectional area to the wetted perimeter; and the hydraulic gradient, S. A generally accepted relationship between the flow velocity and these factors is $$V = \frac{1.49}{n} H_R^{2/3} S^{1/2} \tag{17}$$

When manufactured of a similar material and installed in a similar manner the roughness coefficient and hydraulic gradient are generally the same for both arched and round corrugated conduit. The equivalent cross sectional area for arched conduit, where subscript a indicates arched and subscript c circular, thus is:

$$A_a = A_c\left(\frac{H_{Rc}}{H_{Ra}}\right)^{2/3} = \pi r^2\left(\frac{\pi r^2/2\pi r}{H_{Ra}}\right)^{2/3} \tag{18}$$

where, of course, the hydraulic radius of the arched conduit is a function of its cross sectional area and perimeter. For simplification of equation (18), a dimensionless constant, can be defined as the ratio of the arch hydraulic radius to the square root of the cross sectional area.

$$A_a = \frac{\pi^{3/2} r^2}{(2\mu)^{2/3}} \tag{19}$$

For a parabola the hydraulic radius can be shown to be:

$$H_R = \frac{(\frac{2}{3})f}{\frac{l}{2}\left[1 + 16\left(\frac{f}{l}\right)^2\right]^{\frac{1}{2}} + \frac{1}{16f}\ln\left[\frac{(1 + 16(f/l)^2)^{\frac{1}{2}} + 4(f/l)}{(1 + 16(f/l)^2)^{\frac{1}{2}} - 4(f/l)}\right] + 1} \quad (20)$$

For an ellipse, in which radius a is greater than radius b, the hydraulic radius can be shown to be $$H_R = \frac{\pi b}{4a(0.2854\cos\theta + 0.1427\cos2\theta + 2.1427)} \quad (21)$$

where $$\theta = \sin^{-1}\frac{(a^2 - b^2)^{\frac{1}{2}}}{a} \quad (22)$$

For an ellipse in which radius a is less than radius b, the hydraulic radius can be shown to be $$H_R = \frac{\pi a}{4(0.2854\cos\theta' + 0.1427\cos2\theta' + 1.1427 + a/b)} \quad (23)$$

where $$\theta' = \sin^{-1}\frac{(b^2 - a^2)^{\frac{1}{2}}}{b} \quad (24)$$

When radii a and b are equal, the ellipse is a semicircle of radius r in which $$H_R = \frac{\pi r}{4 + 2\pi} \quad (25)$$

Similarly, hydraulic radii may be determined for other arch cross sections.

From these hydraulic radii, the area of a selected cross section of the arch corresponding to each standard size of round tubing can be determined as a function of the ratio of the arch height to width.

A specific conduit which is equivalent to 4 inch round conduit has parabolic cross section with a height, f, of 3.7 inches and a width, l, of 5.9 inches.

Another design parameter is the minimization of the amount of material in the arch tubing. This may be achieved by minimizing the perimeter of the cross section for a given hydraulic radius. The hydraulic radius, however, is inversely proportional to the perimeter. Thus, determining the height to width ratio at which the above identified constant $\mu$ is maximized determines the height to width ratio which minimizes material.

Figure 16:
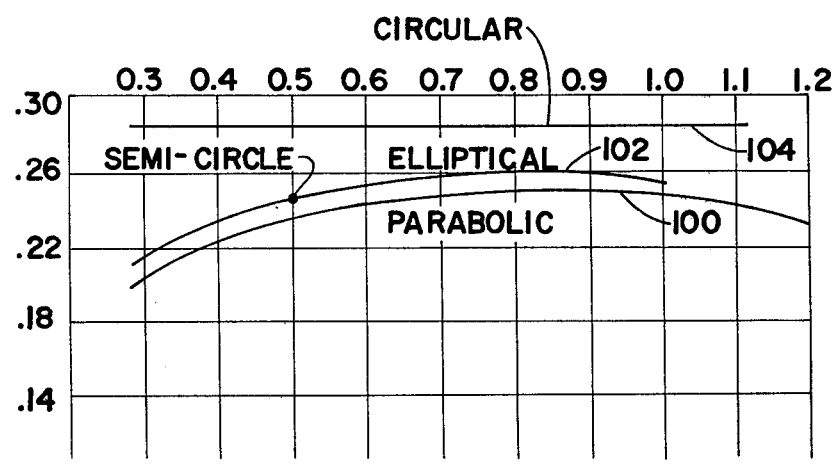
FIG. 16 is a graph of the hydraulic radius/(area)$^{\frac{1}{2}}$ versus the height/width ratio for an arch.

FIG. 16 is a graphic plot of the constant $\mu$, along the vertical axis versus the ratio of the height to the width of an arch along the horizontal axis. It may be noted that curve 100 for a parabolic arch peaks at a height to width ratio of about 0.885. Curve 102 for a semielliptic arch peaks at a height to width ratio of about 0.883. The circular cross section, 104, is, of course, the most efficient in this regard.

The height to width ratio of the arch also affects the strength of the arch. In many installations there is some deflection of the cross section. From the deflection formula (7), it is apparent that the amount of deflection can be reduced by varying the moment of inertia, I(x,y), at each point on the arch with the moment M(x,y) at the same point on the arch, i.e.

$$I(x,y) = f(I_o, M(x,y)) \quad (26)$$

where $I_o$ is the moment of inertia at the apex of the arch. In particular, it is advantageous to vary the moment of inertia with the secant of the angle $\phi$ of the tangent at point (x,y) with respect to the horizontal.

$$I(x,y) = I_o\sec\phi + CI_oM(x,y) \quad (27)$$

where C is an arbitrary constant.

Advantageous results are also achieved by varying the moment of inertia as the square of the bending moment.

$$I(x,y) = f(I_o, M^2(x,y)) \quad (28)$$

Further advantageous results have been achieved by varying the moment of inertia as a function of the bending moment $$I(x,y) = M(x,y) \quad (29)$$

These variations in the moment of inertia are achieved by varying the height of the corrugations.

Figure 17:
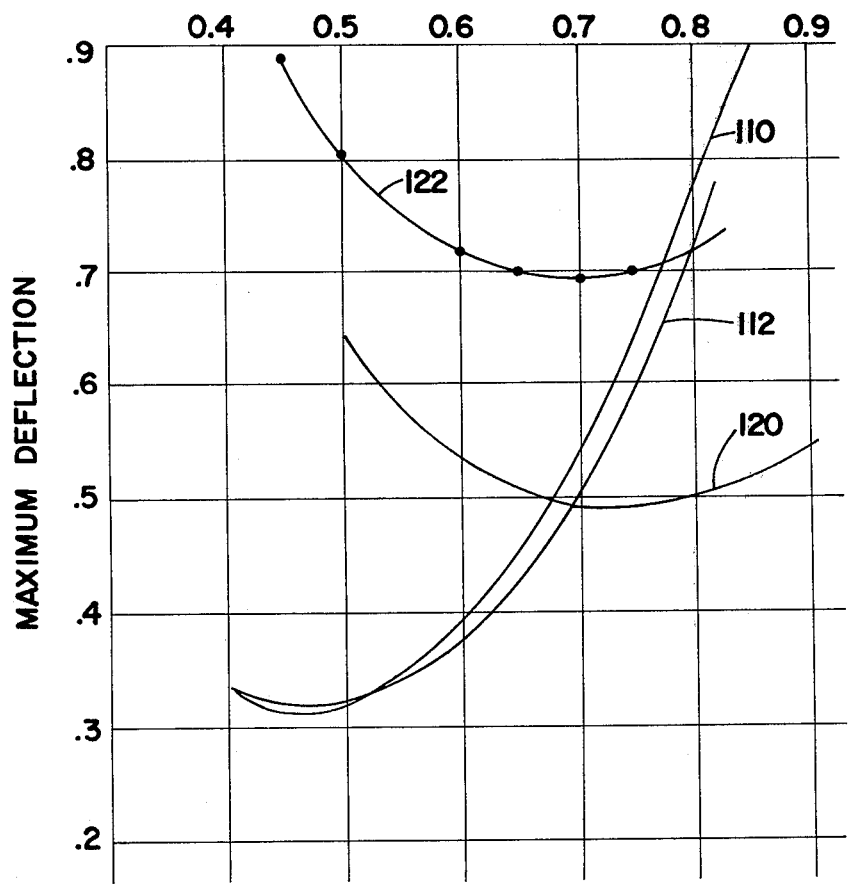
FIG. 17 is a graph of maximum deflection versus the height/width ratio for parabolic conduit.

FIG. 17 is a graphic illustration of the height to width ratio versus the maximum deflection for a parabolic arch. Curve 110 illustrates the maximum deflection under hydrostatic loading when $I = f(I_o, M)$ and curve 112 when $I = f(I_o, M^2)$. Curve 120 illustrates the maximum deflection under parallel plate loading when $I = f(I_o, M)$ and curve 122 when $I = f(I_o, M^2)$ It will be noted that deflection is minimized when $I = f(I_o, M)$.

From FIG. 17 it is also apparent that the height to width ratio of about 0.475 the parabolic arch produces the greatest hydrostatic loading resistance. But it is also apparent that a height to width ratio of about 0.7 to 0.85 produces the greatest parallel plate loading resistance.

The preferred height to width ratio for strength is thus in the range of about 0.45 to 0.90. The ratio of 0.65 is particularly advantageous.

From the above considerations and others the design including the cross sectional shape of the conduit can be modified to bring out specific one or ones of the above advantageous properties.

The invention has been described with reference to the preferred embodiment. Obviously, modifications and alterations will occur to others upon a reading and understanding of this specification. It is our intention to include all such modifications and alterations insofar as they come within the scope of the appended claims or the equivalents thereof.

We claim:

1. A foldable conduit comprising:
    a first wall which is elongated in one direction and having first corrugations extending generally between an opposed first wall apex side edge area and a first wall terminal side edge area, said first corrugations comprising alternating first peak portions and first valley portions, at least one of said first peak portions comprising a first pair of corrugation side walls which connect the first peak portion with adjacent first valley portions and a first top wall which connects the first pair of corrugation walls, said first top wall having a generally undulating cross section between the first pair of corrugation walls;

a second wall which is elongated in said one direction and having second corrugations extending beteen an opposed second wall apex side edge area and a second wall terminal side edge area, said second corrugations comprising alternating second peak portions and second valley portions, at least one of said second peak portions comprising a second pair of corrugation side walls which connect the second peak portion with adjacent second valley portions and a second top wall which connects the second pair of corrugation walls, said second top wall having a generally undulating cross section between the second pair of corrugation walls;

means for connecting said first and second walls along said one direction at generally said first and second wall apex side edge areas, said connecting means allowing said first and second walls to be arcuately moved toward and away from each other, whereby said first and second walls are moveable between a folded position in which said first and second wall terminal side edge areas are substantially adjacent and an unfolded fluid conveying position in which said first and second wall terminal side edge areas are displaced from each other; and, a non-corrugated flexible base connected in both the folded and unfolded positions adjacent said first wall terminal side edge area and connected in both the folded and unfolded positions adjacent said second wall terminal side edge area, said base being elongated in said one direction and having a width disposed between the first and second wall terminal side edge areas, the width of said base limiting the amount by which said first wall terminal edge area and said second wall terminal side edge area can be displaced in the unfolded position and the base being sufficiently flexible across its width that in the folded position said base is adapted to be disposed in a generally folded configuration between said first wall and said second wall.

2. The foldable conduit as set forth in claim 1 wherein each of said first and second top walls comprise a first outward extending rib adjacent a first of the corresponding pair of currugation walls and a second outward extending rib adjacent the second of the corresponding pair of corrugation walls.

3. The foldable conduit as set forth in claim 2 wherein said first and second ribs are rounded and wherein each of said first and second top walls further comprises an inward rounded recess between said first and second ribs.

4. The foldable conduit as set forth in claim 3 wherein each of said valley portions comprise an arcuate valley wall connected between a corresponding pair of corrugation walls.

5. The foldable conduit as set forth in claim 3 wherein said first and second valley portions lie in a common cross section transverse to said one direction, the cross section of the first and second valley portions being substantially parabolic.

6. A foldable, partially corrugated conduit comprising:

a first wall which is elongated in one direction and which has a plurality of first corrugations extending generally transverse to said one direction, said first corrugations extending generally between a first wall apex side edge area which extends substantially in said one direction and a first wall terminal side edge area which extends substantially in said one direction;

a second wall which is elongated in said one direction and which has a plurality of second corrugations extending generally transverse to said one direction, said second corrugations extending generally between a second wall apex side edge area which extends substantially in said one direction and a second wall terminal side edge area which extends substantially in said one direction;

said first and second corrugations comprising alternating peak portions and valley portions, the peak portions comprising pairs of corrugation walls and top walls connecting the pairs of corrugation walls, said top walls having ribs disposed substantially contiguous with each corrugation wall, said valley portions comprising valley walls connecting alternate pairs of corrugation walls;

hinge means connecting said first wall apex side edge area with said second wall apex side edge area, said hinge means providing for said first wall and said second wall to move arcuately generally about the hinge means at least between a folded position in which said first wall terminal side edge area and said second wall terminal side edge area are generally adjacent each other and an unfolded position in which said first wall terminal side edge area and said second wall terminal side edge area are displaced from each other; and a foldable base which is elongated in said one direction, said base being connected substantially adjacent said first wall terminal side edge area and being connected substantially adjacent said second wall terminal side edge area, said foldable base being foldable at least generally along a first fold area disposed substantially adjacent said first wall terminal side edge area, generally along a second fold area disposed substantially adjacent said second wall terminal side edge area, and generally along at least a third folded area extending in said one direction, said third fold area being disposed generally intermediate said first fold area and said second fold area, whereby said foldable base is foldable along at least the first, second, and third fold area as said conduit is moved between the folded and unfolded positions.

7. The foldable partially corrugated conduit as set forth in claim 6 wherein pairs of corrugation walls which are connected by a common top wall converge toward said top wall.

8. A conduit comprising: a longitudinally elongated element which has an apex area disposed substantially at the top of the element and a pair of displaced longitudinal terminal side edge areas disposed generally at the bottom of the element, the terminal side edge areas defining a generally planar base area therebetween; the elongated element having a plurality of transverse corrugations extending from the apex area to both of said terminal side edge areas; said corrugations comprising outward extending peak portions and inward extending valley portions, the peak portions comprising corrugation walls and top walls connecting alternate pairs of corrugation walls, the top walls having a recess between the connected pairs of corrugation walls, the valley portions comprising valley walls connecting alternate pairs of corrugation walls; and, a generally flat base connected between said terminal side edge areas.

9. The conduit as set forth in claim 8 wherein said valley walls are more parabolic in transverse cross section than said top walls and said top walls are more semicircular in transverse cross section than said valley walls.

10. The conduit as set forth in claim 8 further comprising at least one outward extending rib disposed on each of said top walls.

11. The conduit as set forth in claim 8 wherein said recess and said valley walls are arcuate.

12. The conduit as set forth in claim 8 wherein the top wall has a thickness and wherein the depth of the recess is substantially twice the thickness of the top wall.

13. The conduit as set forth in claim 8 wherein the distance between the outward surface of the top walls and the outward surface of the valley walls is the height of the corrugations, said top walls defining an outer surface of the elongated element and the valley walls defining an inner surface of the elongated element; the corrugations having a first height adjacent the terminal edge areas, a second height adjacent the apex area, and between the apex area and the terminal edge areas the corrugations having a height which is greater than the first and second heights and varies with the tendency of the elongated element to deflect at the same point under subterranean loads.

14. The conduit as set forth in claim 13 wherein the height of said corrugations varies as a function of the bending moment at the same point under hydrostatic loading.

15. The conduit as set forth in claim 13 wherein the height of said corrugations varies such that the moment of inertia at each point is proportional to the bending moment at the same point.

16. A corrugated plastic conduit product comprising:
a first corrugated plastic side wall which is elongated along a longitudinal axis, the first side wall having two longitudinally extending edges, the first side wall comprising alternating along the longitudinal axis a plurality of first top walls and first valley walls and a plurality of first corrugation walls connecting adjacent first top walls and first valley walls, the first top walls and first valley walls each extending generally between the two longitudinally extending edges of the first side wall, the first top walls having at least one rib;
a second corrugated plastic side wall which is elongated along the longitudinal axis, said second side wall having two longitudinally extending edges, the second side wall comprising alternating along the longitudinal axis a plurality of second top walls and second valley walls and a plurality of second corrugation walls connecting adjacent second top walls and second valley walls, the second top walls and second valley walls extending generally between the two longitudinally extending edges of the second side wall, the second top walls, having at least one rib, one of said second side wall's longitudinally extending edges being integrally connected with one of said first side wall's longitudinally extending edges; and
a smooth base which is connected longitudinally adjacent the longitudinally extending edges of the first side wall and the second side wall such that the first wall, the second wall, and the base define a hollow fluid conveying region.

17. The corrugated plastic conduit product as set forth in claim 16 wherein the first and second top walls have a pair of ribs separated by a recess between each pair of ribs.

18. A corrugated plastic conduit which is disposable in a folded and in an open configuration, said conduit comprising:
a first corrugated plastic side wall which is elongated along a longitudinal axis said first side wall having a longitudinally extending apex side edge area and a longitudinally extending terminal side edge area, said first side wall having first corrugations comprising first peak portions and first valley portions alternating along the longitudinal axis and extending generally between the apex side edge area and the terminal side edge area of the first side wall, said first peak portion having inward recesses extending at least partially between the apex side edge area and the teminal side edge area of the first side wall;
a second corrugated plastic side wall which is elongated along the longitudinal axis said second side wall having a longitudinal extending apex side edge area and a longitudinally extending terminal side edge area, said second side wall having second corrugations comprising second peak portions and second valley portions alternating along the longitudinal axis and extending generally between the apex side edge area and the terminal side area of the second side wall, said second peak portions having recesses extending at least partially between the apex side edge area and the terminal side edge area of the second side wall;
means for connecting the apex side edge areas of said first and second walls together in such a manner that in the open configuration the terminal side edge areas of the first and second walls are displaced and the connected first and second walls have a generally arch-like cross section transverse to the longitudinal axis; and,
a generally flat base which is elongated along the longitudinal axis and has a width transverse to the longitudinal axis, said base being foldably connected with the terminal side edge areas of said first and second walls to allow relative folding between the base and the first and second walls, the width of the base limiting the amount by which the terminal side edge areas of said first and second wall can be displaced in the open configuration, whereby the first and second side walls can be folded generally parallel to each other to form the folded configuration of the conduit.

19. The conduit as set forth in claim 18 wherein the first and second peak portions extend outward and the first and second valley portions extend inward, the difference in the extension between the peak and valley portions being the corrugation height, the corrugation height adjacent the apex side edge of the first and second wide walls and the terminal side edge of the first and second side walls being less than the corrugation height at intermediate areas of the first and second walls between the apex and terminal side edges, said recesses in the first and second peak portions extending at least through the intermediate area.

20. A corrugated plastic conduit comprising:
a first corrugated plastic wall which is elongated along a longitudinal axis, the first corrugated plastic wall having first and second longitudinally extending edges;

a second corrugated plastic wall which is elongated along the longitudinal axis, the second corrugated plastic wall having first and second longitudinally extending edges, the second corrugated plastic wall's first longitudinally extending edge being integrally formed with the first corrugated plastic wall's first longitudinally extending edge, whereby the first and second corrugated plastic walls form a unitary elongated element having an open cross section; and, a noncorrugated, flexible base which is thinner than the first and second corrugated plastic walls, the base being connected adjacent the second longitudinally extending edge of the first corrugated plastic wall and the second longitudinally extending edge of the second corrugated wall, the base being freely flexible along the longitudinal axis.

21. The corrugated plastic conduit as set forth in claim 20 wherein the first corrugated plastic wall is arcuate transverse to the longitudinal axis and the second corrugated plastic wall is arcuate transverse to the longitudinal axis, whereby the conduit has a generally semiround cross section.

22. The corrugated plastic conduit as set forth in claim 20 wherein the first corrugated plastic wall is generally linear transverse to the longitudinal axis and the second corrugated plastic wall is generally linear transverse to the longitudinal axis, whereby the conduit has a generally triangular cross section.

23. The corrugated plastic conduit as set forth in claim 22 further including at least one longitudinal hinge means which is integrally formed generally along the integral connection of the first and second corrugated plastic walls longitudinally extending connected edges.

24. The corrugated plastic conduit as set forth in claim 22 wherein the flexible base is porous to allow fluid flow therethrough.

* * * * *